(12) United States Patent
Zhang et al.

(10) Patent No.: US 12,451,820 B1
(45) Date of Patent: Oct. 21, 2025

(54) TURBULENCE-ENHANCED LIQUID-SOLID FRICTION NANO POWER GENERATION DEVICE

(71) Applicant: Guangdong Ocean University, Zhanjiang (CN)

(72) Inventors: Qianxi Zhang, Zhanjiang (CN); Shishi Li, Zhanjiang (CN); Qing Xu, Zhanjiang (CN); Jin Yan, Zhanjiang (CN); Peng Zhang, Zhanjiang (CN); Yan Liu, Zhanjiang (CN); Yaokang Zhang, Zhanjiang (CN); Tengqing Liu, Zhanjiang (CN); Denghui Li, Zhanjiang (CN); Xiaopeng Luo, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 19/003,340

(22) Filed: Dec. 27, 2024

Related U.S. Application Data

(63) Continuation of application No. PCT/CN2024/089121, filed on Apr. 22, 2024.

(30) Foreign Application Priority Data

Apr. 25, 2023 (CN) .......................... 202310451615.5

(51) Int. Cl.
H02N 1/04 (2006.01)
(52) U.S. Cl.
CPC ...................... H02N 1/04 (2013.01)
(58) Field of Classification Search
CPC ....................................................... H02N 1/04
(Continued)

(56) References Cited

U.S. PATENT DOCUMENTS 4,126,822 A * 11/1978 Wahlstrom ............... H02N 1/08
310/309
7,446,450 B2 * 11/2008 Boland ..................... H02N 1/08
310/11
(Continued)

FOREIGN PATENT DOCUMENTS

CN      104980060 A    10/2015
CN      208042500 U    11/2018
(Continued)

OTHER PUBLICATIONS

CN 118748518 (Year: 2024).*
(Continued)

*Primary Examiner* — Ahmed Elnakib
(74) *Attorney, Agent, or Firm* — Pilloff Passino & Cosenza LLP; Rachel K. Pilloff; Sean A. Passino (57) ABSTRACT

A turbulence-enhanced liquid-solid friction nano power generation device is provided, including multiple power generation cores connected in parallel. Each of the power generation cores includes an outer tube, a friction liquid, external friction electrodes, internal turbulators and internal friction electrodes. When the power generation cores undergo a swing motion, the friction liquid inside the outer tube rubs against an inner wall of the outer tube and an outer membrane of each of the internal turbulators to generate charges; and the charges are transferred based on the external friction electrodes and the internal friction electrodes, and an alternating current is generated and is led out through an external wire.

6 Claims, 11 Drawing Sheets

(58) Field of Classification Search
USPC .................................................. 310/309, 310
See application file for complete search history.

(56) References Cited

U.S. PATENT DOCUMENTS

| | | | |
|---|---|---|---|
| 11,863,088 B2* | 1/2024 | Zhang | .................... H02N 2/186 |
| 2016/0344308 A1* | 11/2016 | Wang | ........................ H02N 1/04 |
| 2024/0048073 A1* | 2/2024 | Yong | ......................... H02N 1/04 |
| 2025/0093268 A1* | 3/2025 | Chen | .................... G01N 21/658 |

FOREIGN PATENT DOCUMENTS

| | | | | |
|---|---|---|---|---|
| CN | 109039143 A | | 12/2018 | |
| CN | 109980985 A | | 7/2019 | |
| CN | 114268237 Y | | 4/2022 | |
| CN | 114400922 A | | 4/2022 | |
| CN | 115514251 A | | 12/2022 | |
| CN | 116365916 A | | 6/2023 | |
| CN | 118842345 B | * | 2/2025 | .............. F03B 13/14 |
| EP | 3131195 A | | 2/2017 | |
| KR | 20160073547 A | | 6/2016 | |

OTHER PUBLICATIONS

Retrieval report-First search dated Jan. 12, 2024 in SIPO application No. 202310451615.5.
Retrieval report-Supplementary search dated Feb. 21, 2024 in SIPO application No. 202310451615.5.
Notification to Grant Patent Right for Invention dated Feb. 23, 2024 in SIPO application No. 202310451615.5.
International Search Report dated May 27, 2024, in corresponding PCT Application No. PCT/CN2024/089121.
Notice of first Office action dated Jan. 12, 2024 in SIPO application No. 202310451615.5.
Xiaoyi Li, et al., Networks of High Performance Triboelectric Nanogenerators Based on Liquid-Solid Interface Contact Electrification for Harvesting Low-Frequency Blue Energy, Advanced Energy Materials, Jul. 25, 2018, vol. 8. No. 1800705, pp. 1-7; DOI: 10.1002/aenm.201800705 p. 2-6 Part 2, Figure 1-2, Claims involved: 1-8.

* cited by examiner

TURBULENCE-ENHANCED LIQUID-SOLID FRICTION NANO POWER GENERATION DEVICE

CROSS-REFERENCE TO RELATED APPLICATIONS

This application is a continuation of PCT/CN2024/089121, filed on Apr. 22, 2024, and claims priority of Chinese Patent Application No. 202310451615.5, filed on Apr. 25, 2023, the entire contents of which are incorporated herein by reference.

TECHNICAL FIELD

The present disclosure belongs to the technical field of power generation, and in particular relates to a turbulence-enhanced liquid-solid friction nano power generation device.

BACKGROUND

At present, electromagnetic induction generators are almost used in the development of marine energy. Electromagnetic induction generators have obvious advantages in collecting high-frequency mechanical energy, but they have shortcomings such as low conversion efficiency in collecting low-frequency irregular marine energy. Collecting wave energy by electromagnetic induction generators needs to convert wave energy into hydraulic or pneumatic energy, and then drive electromagnetic induction generators to generate electricity. There are many energy conversion processes and many components to be maintained. Therefore, wave energy collected by electromagnetic induction generators is mostly used in high-power wave energy power generation devices.

At present, storage battery power supply and photovoltaic power supply are mostly used for small equipment such as buoys and hydrologic detectors arranged in the ocean. The storage battery has limited capacity and short service life, and needs to be replaced manually and frequently. Also, there is a risk of pollution leakage, which causes great pollution to the ocean. When solar panels are used for power supply, although the sea air is relatively clean, the salinity of the marine environment is high and the materials are easy to be corroded. Moreover, due to the fact that solar power generation devices in the ocean are prone to becoming foothold and habitat for seabirds, bird droppings may contaminate solar panels, leading to a significant decrease in power generation efficiency, and ultimately affecting the stability of electrical equipment operation.

Friction nano power generation is a new way developed in recent years. The existing solid-solid friction power generation device has some shortcomings, such as small friction contact area and easy wear of friction surface, which will lead to the attenuation of output power. The existing friction nano power generation device has the disadvantage of small output power per unit volume. In order to meet the power demand of electrical equipment, there is a need to increase the number of parallel power generation cores, which leads to the excessive size of the power generation device. Therefore, it is necessary to develop a liquid-solid friction nano power generation device that may improve the output efficiency of power generation.

SUMMARY

An objective of the present disclosure is to provide a turbulence-enhanced liquid-solid friction nano power generation device, so as to solve the problems existing in the prior art.

In order to achieve the above objectives, the present disclosure provides the turbulence-enhanced liquid-solid friction nano power generation device, including multiple power generation cores connected in parallel, each of the power generation cores includes an outer tube, a friction liquid, external friction electrodes, internal turbulators and internal friction electrodes;

when the power generation cores undergo swing motions, the friction liquid inside the outer tube rubs against an inner wall of the outer tube and an outer membrane of each of the internal turbulators to generate charges; and the charges are transferred based on the external friction electrodes and the internal friction electrodes, and an alternating current is generated and is led out through an external wire.

In an embodiment, the outer tube adopts a polytetrafluoroethylene (PTFE) tube, and an outer tube wall is attached or sprayed with a conductive material.

In an embodiment, the external friction electrodes and the internal friction electrodes are connected in parallel and are each electrically connected with the external wire.

In an embodiment, friction layers of the external friction electrodes and the internal friction electrodes adopt insulating materials, and the insulating materials include but not limited to PTFE, polyethylene terephthalate (PET), polydimethylsiloxane (PDMS) or polyvinyl chloride (PVC).

In an embodiment, electrode materials of the external friction electrodes and the internal friction electrodes all adopt conductive materials, and the conductive materials include but not limited to copper foils or aluminum foils.

In an embodiment, a shape of each of the internal turbulators adopts a sheet form, a spiral form, a cylindrical form or a conical form.

In an embodiment, a friction layer of each of the internal turbulators is attached or plated with an insulating material.

In an embodiment, each of the internal turbulators adopts a conductive material or a non-conductive material, and when the non-conductive material is used, an electrode of each of the internal turbulators is attached or plated with the conductive material.

In an embodiment, the friction liquid adopts deionized water, magnetic fluid or water solution.

The present disclosure has the following technical effects.

Compared with the traditional electromagnetic induction generator, the power generation core of the present disclosure is simple to manufacture, and has little pollution to the marine environment compared with the storage battery.

The liquid-solid friction nano power generation device according to the present disclosure drives the friction between the friction liquid in the tube and the friction layer through the low-frequency movement around, and a potential difference is generated between two poles, thus driving the electrons to move directionally, directly converting kinetic energy into electric energy and avoiding energy loss in the multi-stage energy conversion process.

On the basis of the original tubular liquid-solid friction nanogenerator, the power generation core according to the present disclosure is structurally enhanced with turbulence. By adding the turbulators inside, the friction area between the friction liquid per unit volume and the friction layer may be increased, thus increasing the output power per unit volume.

The turbulators enhance the liquid turbulence in the tube and the liquid-solid interface friction, thus increasing the output power per unit volume.

The power generation cores in the present disclosure generate power along with the swing of the sea waves, and the sea waves exist all the time, so that the power supply to the offshore equipment may be realized all the time, and the shortcomings that the storage battery power supply is not continuous and needs manual maintenance are made up.

According to the present disclosure, liquid-solid friction nano power generation devices with different output power may be designed and manufactured by increasing or decreasing the number of power generation cores. Through the power supply circuit control system, different power supply requirements and the requirements of application scenarios may be met.

BRIEF DESCRIPTION OF THE DRAWINGS

The accompanying drawings, which constitute a part of the present disclosure, are used to provide a further understanding of the present disclosure. The illustrative embodiments of the present disclosure and their descriptions are used to explain the present disclosure, and do not constitute an improper limitation of the present disclosure. In the attached drawings.

DETAILED DESCRIPTION OF THE EMBODIMENTS

It should be noted that the embodiments in this application and the features in the embodiments may be combined with each other without conflict. The present disclosure will be described in detail with reference to the attached drawings and embodiments.

Embodiment 1

Figure 1:
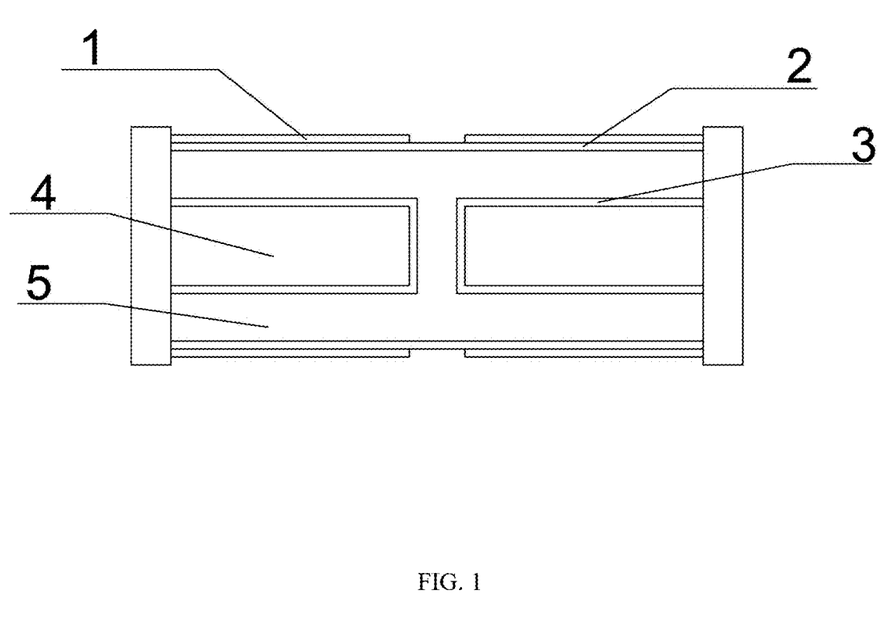
FIG. 1 is a schematic structural diagram of a power generation core in an embodiment of the present disclosure.
Figure 2:
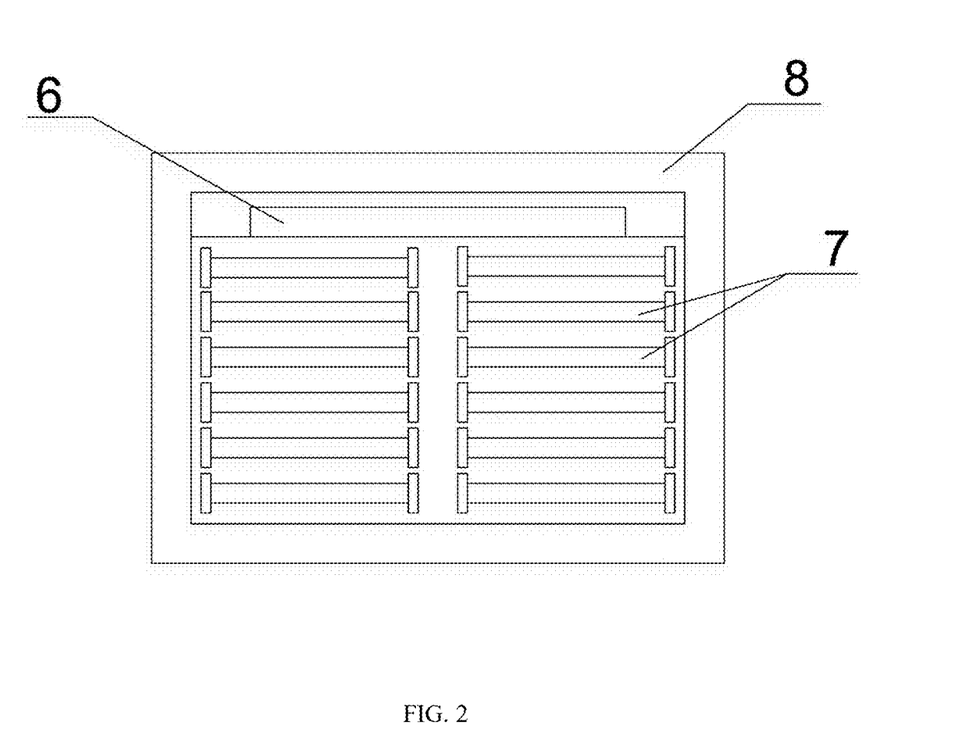
FIG. 2 is a schematic structural diagram of a power generation device in an embodiment of the present disclosure.

As shown in FIG. 1 to FIG. 8, and FIG. 9A and FIG. 9B, this embodiment provides a turbulence-enhanced liquid-solid friction nano power generation device. FIG. 2 is a schematic structural diagram of the power generation device in this embodiment, the power generation device a power management controller 6, power generation cores 7 and an outer housing 8.

The power generation device in this embodiment includes multiple power generation cores. The power generation cores are connected in parallel, and the number and lengths of the power generation cores may be adjusted according to the power supply equipment. A single power generation core includes external friction electrodes 1, an outer tube 2, internal friction electrodes 3, internal turbulators 4 and a friction liquid 5. The outer tube 2 of the core adopts a PTFE tube, and the inner surface of the outer tube may be decorated with a micro-nano material to increase the friction between the liquid in the tube and the inner tube wall. The outer tube wall is attached or sprayed with conductive materials, such as copper foils as double electrodes. The outer tube 2 contains a certain amount of friction liquid, such as deionized water. The internal turbulator 4 may be made of conductive materials with different shapes, such as copper sheets as double electrodes, and the internal turbulator may be coated with a layer of PTFE membrane or sprayed with a PTFE material, which not only serves as a friction layer but also maintains the tightness of the electrodes. The internal friction electrodes 3 and the external friction electrodes 1 are all connected with external wires 9 and are connected in parallel to form a single power generation core. When a power generation core sways with the waves, the friction between the liquid in the tube and the inner tube wall causes charge transfer and the charges are led out through the wires, generating alternating current. The cycle of alternating current is the frequency of the power generation core swinging back and forth once.

In an embodiment, the friction layers of the internal friction electrodes 3 and the external friction electrodes 1 may be made of insulating materials with strong electron-accepting ability, such as PTFE, PET, PDMS, PVC, etc. The electrodes may be made of copper foils or aluminum foils.

In an embodiment, the internal turbulators 4 may be in different shapes such as in a sheet form, a spiral form, a cylindrical form, a conical form, etc. The electrode of the internal turbulator 4 may be directly made of conductive material or attached or plated with conductive material. The friction layer of the internal turbulator 4 may be attached or plated with insulating material. The friction liquid 5 may be deionized water, magnetic fluid, aqueous solution or other liquids.

The working principle of the turbulence-enhanced liquid-solid friction nano power generation device provided in this embodiment is as follows. The cores are driven to swing by the oscillation of waves, and the liquid in each liquid-solid friction nano power generation core contacts and rubs with the inner wall of the core tube and the outer membranes of the turbulators. Due to the triboelectrification effect, there is uneven charge distribution on the surfaces of the solid materials, and a potential difference is generated between the two electrodes. Electrons are transferred through the back electrodes of the solid materials and the inner electrodes of the turbulators under the drive of the potential difference, generating a certain regular alternating current.

Figure 3A:
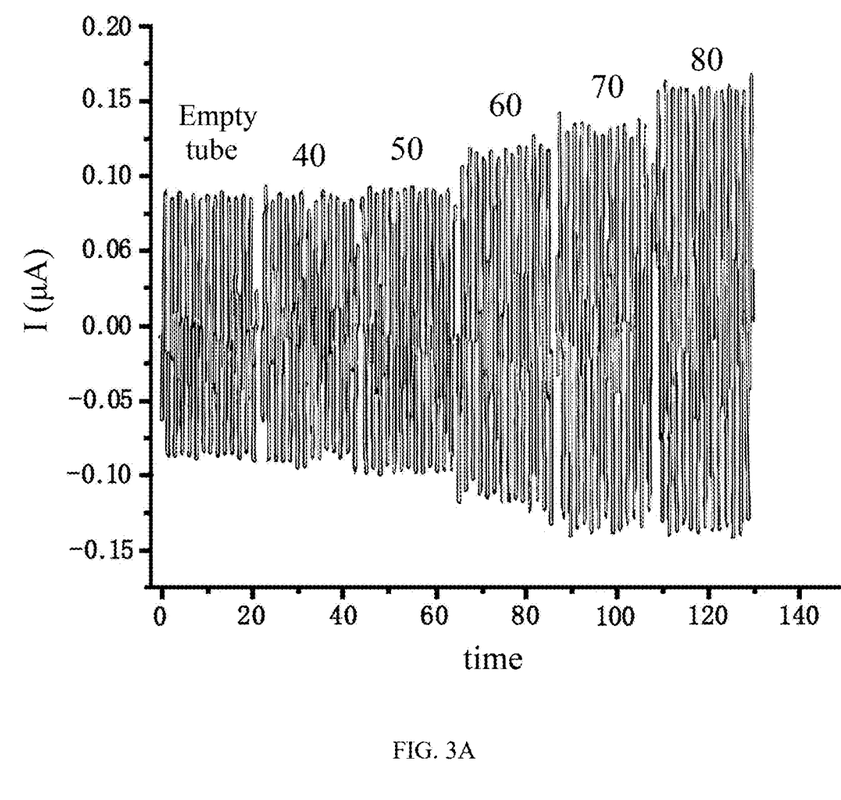
FIG. 3A is a comparison diagram of output current before and after turbulator enhancement.
Figure 3B:
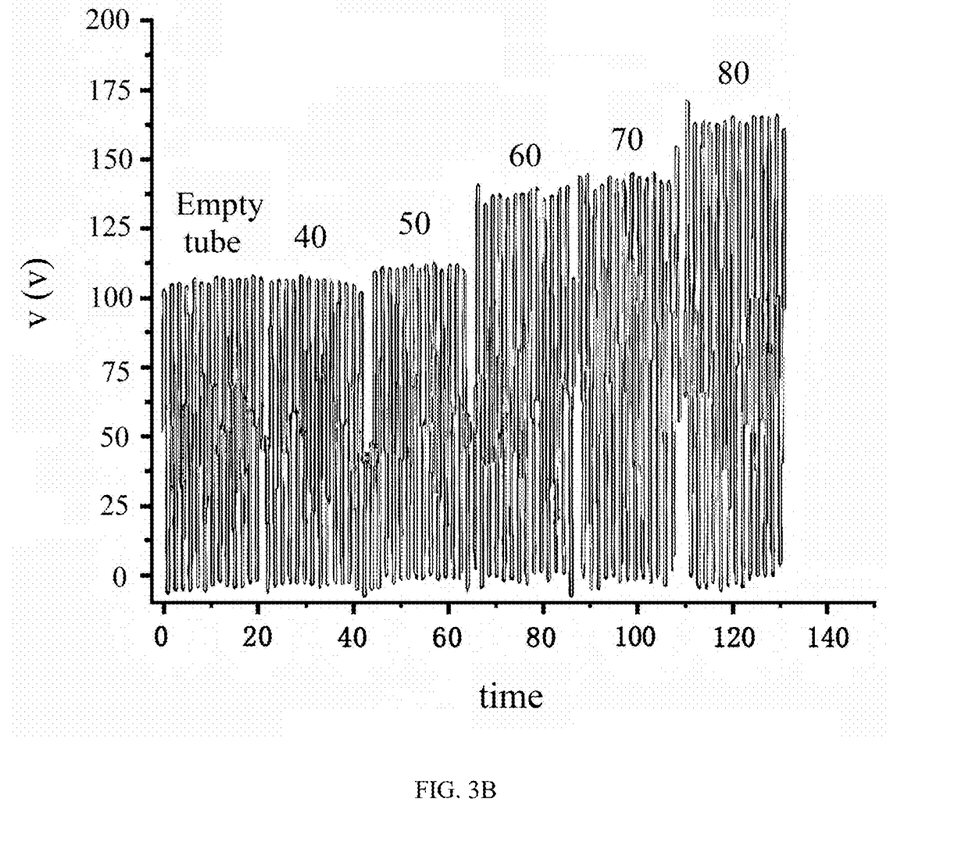
FIG. 3B is a comparison diagram of output voltage before and after turbulator reinforcement.
Figure 4:
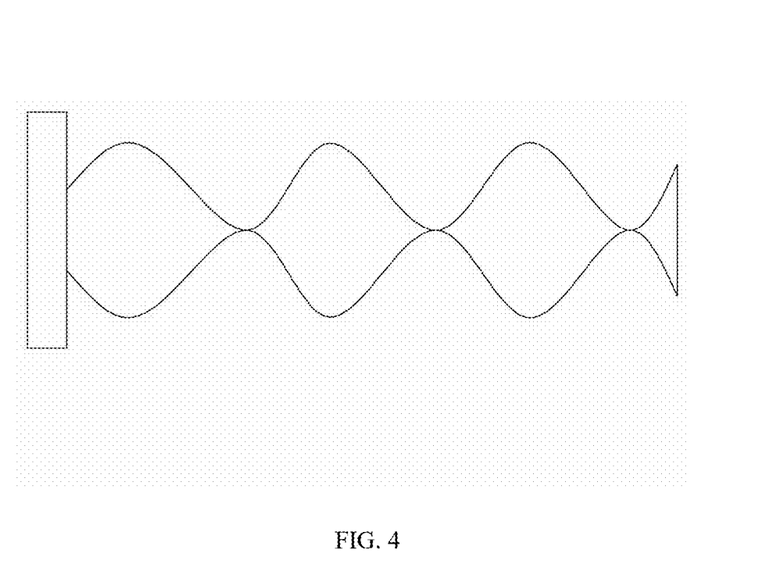
FIG. 4 is a schematic diagram of a spiral turbulator in an embodiment of the present disclosure.
Figure 5:
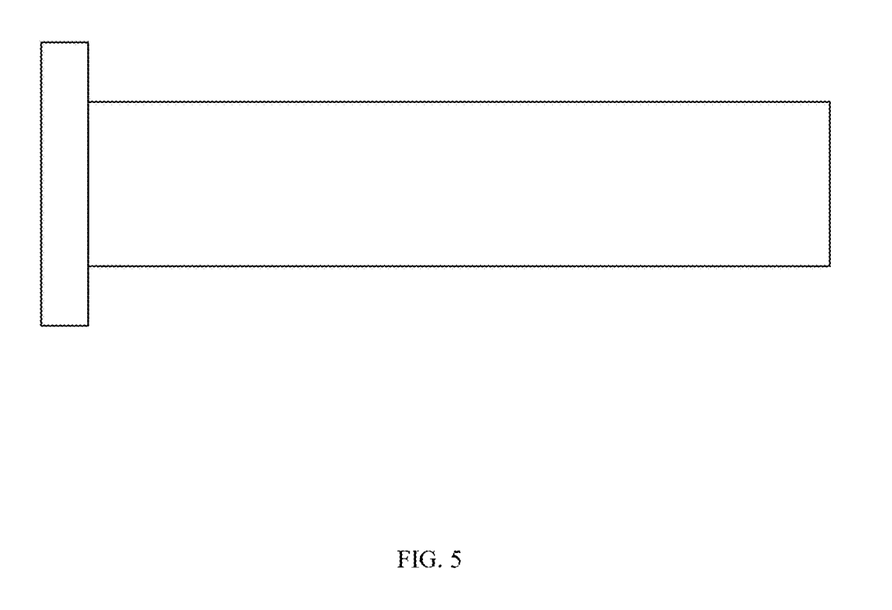
FIG. 5 is a schematic diagram of a cylindrical turbulator in an embodiment of the present disclosure.
Figure 6:
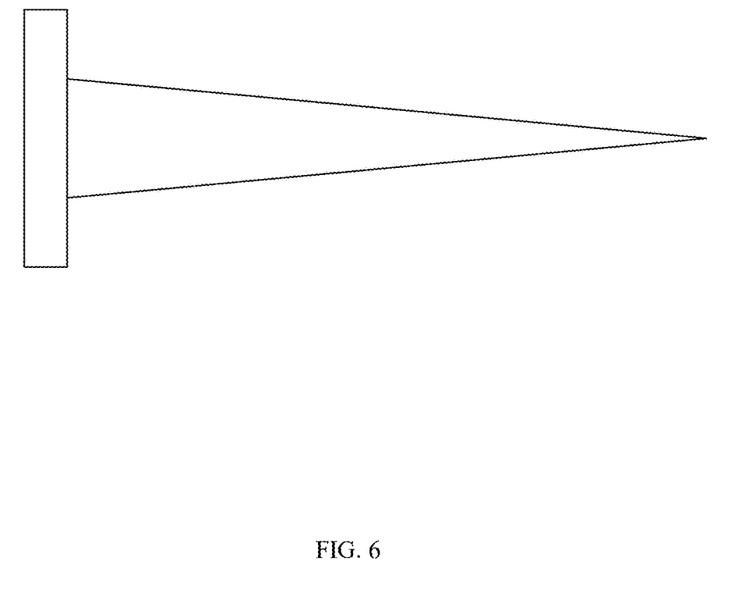
FIG. 6 is a schematic diagram of a conical turbulator in an embodiment of the present disclosure.
Figure 7:
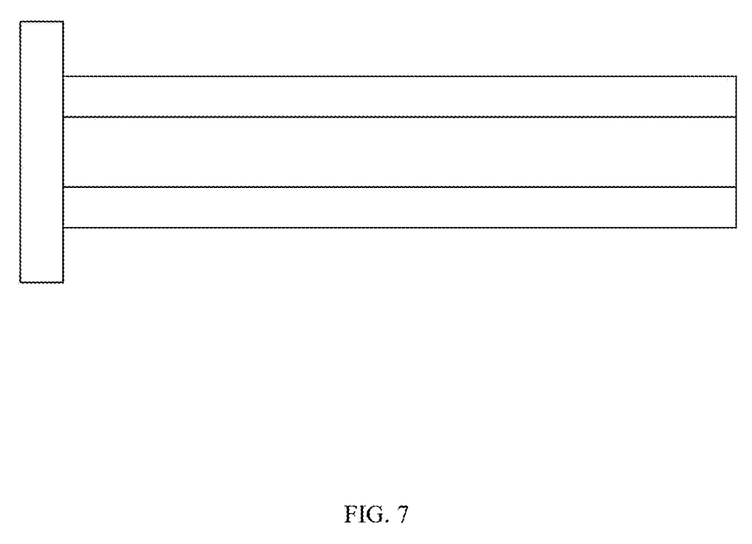
FIG. 7 is a schematic diagram of an annular turbulator in an embodiment of the present disclosure.
Figure 8:
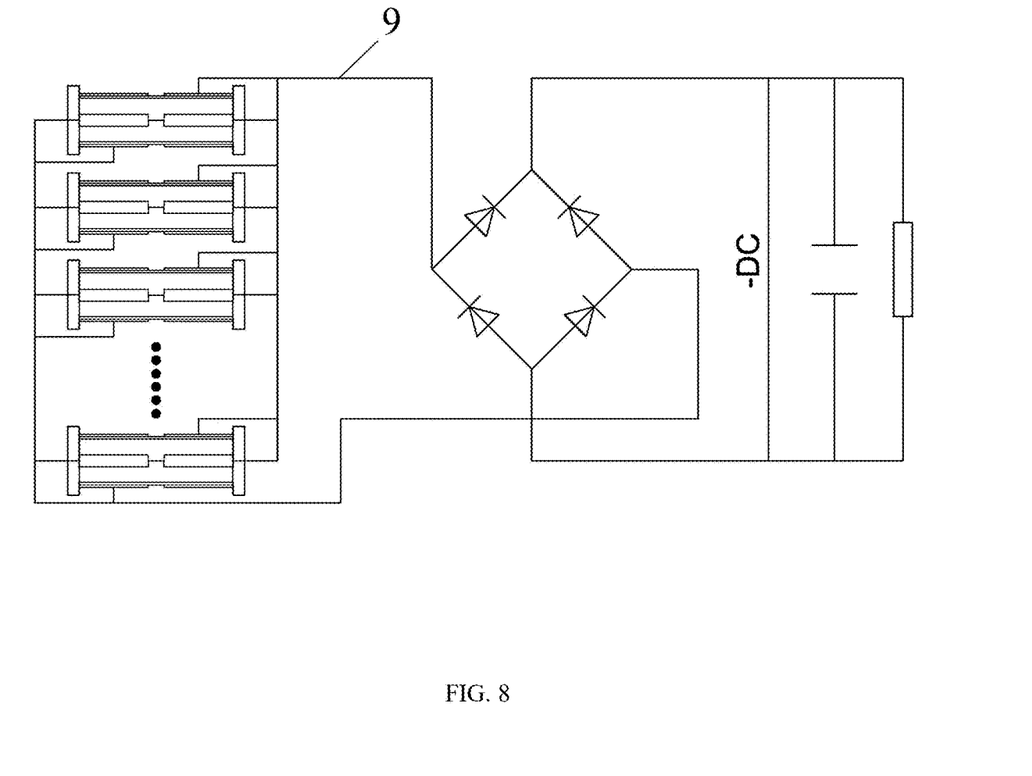
FIG. 8 is a parallel circuit diagram of power generation cores with turbulators in an embodiment of the present disclosure.
Figure 9A:
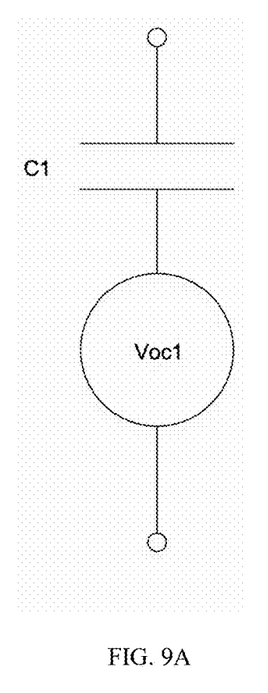
FIG. 9A is a principle diagram of a circuit without turbulators in an embodiment of the present disclosure.
Figure 9B:
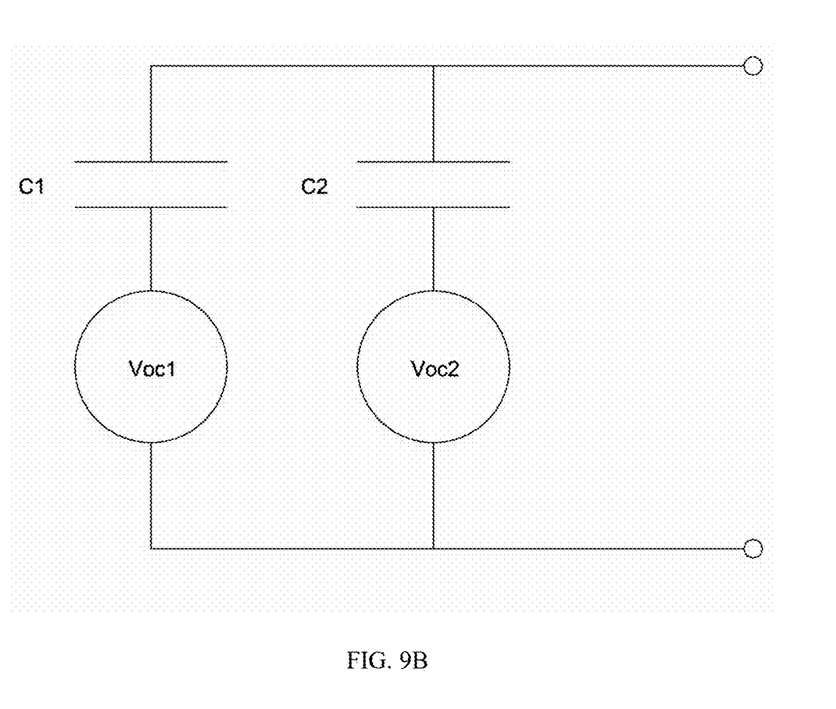
FIG. 9B is a principle diagram of a circuit with turbulators in an embodiment of the present disclosure.

In this embodiment, the outer tube has an inner diameter of 18 millimeters (mm) and an outer diameter of 21 mm, and a length of 200 mm, the length of the external electrode is 80 mm, and different lengths of sheet-shaped turbulators are added inside as an example. The motion frequency for both the empty tube and the sheet-shaped turbulators of various lengths is maintained at 1 hertz (Hz), with a stroke of 200 mm. The experimental results are shown in FIG. 3A and FIG. 3B. In the embodiment, FIG. 3A illustrates the short-circuit current when the tube is empty and when the turbulator lengths are 40 mm, 50 mm, 60 mm, 70 mm, and 80 mm, respectively. FIG. 3B illustrates the open-circuit voltage when the tube is empty and when the turbulator lengths are 40 mm, 50 mm, 60 mm, 70 mm, and 80 mm, respectively. The short-circuit current and open-circuit voltage of the empty tube are 0.087 microamperes (μA) and 109 volts (V) respectively. The short-circuit current and open-circuit voltage are 0.147 μA and 167 V respectively when the length of the turbulator is 80 mm, which are increased by 70% and 53.2% respectively. Compared with the original empty tube, the output power after adding turbulators for enhancement is significantly increased.

Compared with the traditional electromagnetic induction generator, the power generation core in this embodiment has the advantages of simple manufacture, low cost and little pollution to the marine environment compared with the storage battery. Moreover, the liquid-solid friction nano power generation device provided in this embodiment drives the friction between the friction liquid in the tube and the friction layers through the low-frequency movement around, and a potential difference is generated between the two poles, thus driving the electrons to move directionally, directly converting kinetic energy into electric energy and avoiding energy loss in the multi-stage energy conversion process. In addition, on the basis of the original tubular liquid-solid friction nanogenerator, the power generation core in this embodiment is structurally enhanced with turbulence. By adding the turbulators inside, the friction area between the friction liquid per unit volume and the friction layer may be increased, thus increasing the output power per unit volume. The power generation device generates power along with the swing of the sea waves, and the sea waves exist all the time, so that the power supply to the offshore equipment may be realized all the time, and the shortcomings that the storage battery power supply is not continuous and needs manual maintenance are made up.

The above is only the preferred embodiment of the present disclosure, but the protection scope of the present disclosure is not limited to this. Any change or replacement that may be easily thought of by any person skilled in the art within the technical scope disclosed in the present disclosure should be covered by the present disclosure. Therefore, the protection scope of the present disclosure should be based on the protection scope of the claims.

What is claimed is:

1. A turbulence-enhanced liquid-solid friction nano power generation device, comprising: a plurality of power generation cores connected in parallel, wherein each of the power generation cores comprises an outer tube, a friction liquid, external friction electrodes, internal turbulators and internal friction electrodes;
   when the power generation cores undergo a swing motion, the friction liquid inside the outer tube rubs against an inner wall of the outer tube and an outer membrane of each of the internal turbulators to generate charges; and the charges are transferred based on the external friction electrodes and the internal friction electrodes, and an alternating current is generated and is led out through an external wire;
   a shape of each of the internal turbulators adopts a sheet form, a spiral form, a cylindrical form or a conical form; and
   each of the internal turbulators is attached or plated with an insulating material as a friction layer.

2. The turbulence-enhanced liquid-solid friction nano power generation device according to claim 1, wherein the outer tube adopts an insulating material, and an outer tube wall is attached or sprayed with a conductive material.

3. The turbulence-enhanced liquid-solid friction nano power generation device according to claim 1, wherein the external friction electrodes and the internal friction electrodes are connected in parallel and are respectively electrically connected with the external wire.

4. The turbulence-enhanced liquid-solid friction nano power generation device according to claim 1, wherein friction layers of the external friction electrodes and the internal friction electrodes adopt insulating materials, and the insulating materials comprise PTFE, PET, PDMS or PVC.

5. The turbulence-enhanced liquid-solid friction nano power generation device according to claim 1, wherein electrode materials of the external friction electrodes and the internal friction electrodes all adopt conductive materials, and the conductive materials comprise copper foils or aluminum foils.

6. The turbulence-enhanced liquid-solid friction nano power generation device according to claim 1, wherein the friction liquid adopts deionized water, magnetic fluid or water solution.

* * * * *